United States Patent
Pinson et al.

[11] Patent Number: 5,843,365
[45] Date of Patent: Dec. 1, 1998

[54] DIRECTED FIBER PREFORMING APPARATUS AND METHOD HAVING FIBER LAY-UP CONTROL

[75] Inventors: David R. Pinson, Dover, N.H.; Robert A. Hames, York, Me.; Josh Kelman, Rochester Hills, Mich.

[73] Assignee: Textron Automotive Company Inc., Troy, Mich.

[21] Appl. No.: 778,784

[22] Filed: Jan. 6, 1997

[51] Int. Cl.⁶ .................................................. B27N 5/00
[52] U.S. Cl. ....................... 264/517; 264/121; 425/80.1
[58] Field of Search .................................. 264/517, 121; 425/80.1; 296/39.1, 39.2, 900, 901

[56] References Cited

U.S. PATENT DOCUMENTS

| | | | |
|---|---|---|---|
| 4,333,678 | 6/1982 | Munoz et al. | 296/39.2 |
| 4,336,963 | 6/1982 | Nix et al. | 296/39.2 |
| 5,520,758 | 5/1996 | Kelman et al. | 264/517 |

OTHER PUBLICATIONS

Modern Plastics Encyclopedia 1980–1981, p. 290.
Modern Plastics Encyclopedia 1984–1985, pp. 332–333.

*Primary Examiner*—Mary Lynn Theisen
*Attorney, Agent, or Firm*—Reising, Ethington, Learman & McCulloch PLLC

[57] ABSTRACT

A preform of complex three-dimensional shape is prepared by a directed fiber preforming process in which a flow of chopped fibers are drawn by vacuum against a foraminous screen having a shape corresponding to that of preform to be made. The screen has depressed regions that are susceptible to excessive build-up of the chopped fibers. To counteract the build-up in these areas, a baffling system is provided behind the screen having baffle plates which are extendable into and out of blocking engagement with the backside of the problem depressed regions to govern the vacuum draw and hence the deposit and build-up of fibers across the depressed regions.

10 Claims, 3 Drawing Sheets

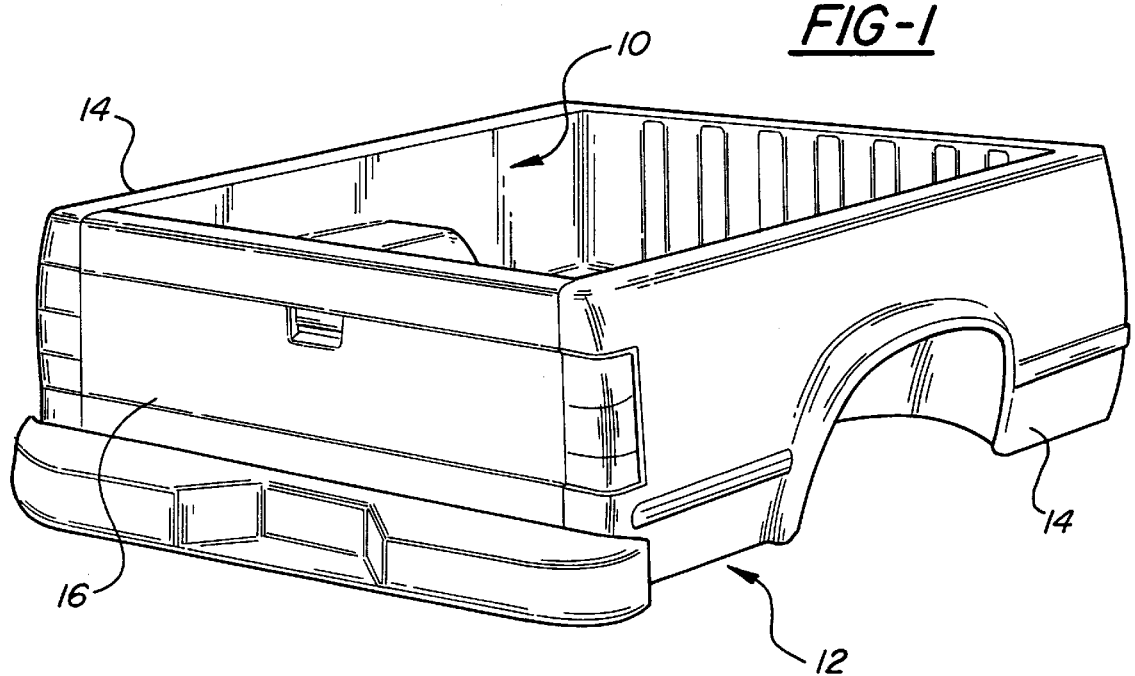
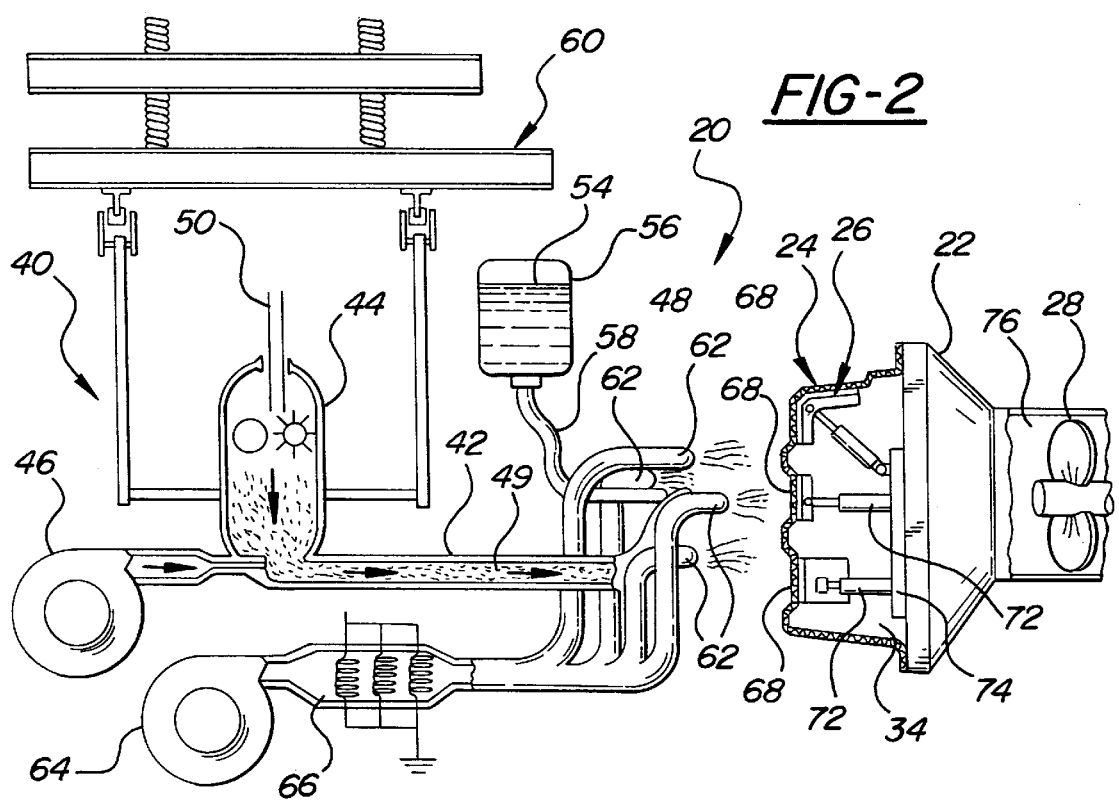

DIRECTED FIBER PREFORMING APPARATUS AND METHOD HAVING FIBER LAY-UP CONTROL

This invention relates generally to directed fiber preforming and more particularly to a process and apparatus for forming fibrous structural preforms of complex three dimensional shape.

BACKGROUND OF THE INVENTION

Structural glass fiber preforms have been commonly incorporated into engineered plastics for applications such as automotive bumpers for added strength and durability. Typically, the glass fiber preform is placed in a mold where reactive plastic is injected causing the preform to become imbedded in the plastic material to generate a structural reaction injection molded (SRIM) article.

It has been found advantageous to form the preform by a directed fiber preforming process in which chopped glass fibers are blown against a foraminous preform screen through which a vacuum is drawn to hold the fibers against the screen and a binder applied and allowed to cure which sets the fibers in place. U.S. Pat. Nos. 5,217,672 and 5,336,455, both commonly owned by the assignee of this invention disclose the current practice of making directed fiber preforms. Until presently, the preforms made have been of a manageable size and fairly simple in shape for producing primarily SRIM automotive bumpers. It is important in the making of a structural fibrous preform that the thickness of the preform be controlled in most cases to develop a generally uniform thickness preform which, in turn, imparts generally uniform strength throughout the final formed SRIM article. Controlling the thickness of the preform is directly dependent on the ability to control the lay-up of the fibers blown onto the preform screen. Currently, fiber lay-up has been successfully controlled by controlling the movement of the fiber delivery nozzle in relation to the screen.

In recent efforts to apply conventional directed fiber preforming practice to the making of a much larger preform of complex three dimensional shape, and namely a preform for the manufacture of a SRIM utility box for a pick-up truck, it was discovered that fiber lay-up could not effectively be controlled by simply controlling the movement of the nozzle and excessive build up of fibers occurred in inside corner regions where there were sharp changes in the contour of the preform screen, such as a long sharp channel-like depressed regions in the screen representing the strengthening ribs commonly found in a pick-up box that extend along the floor of the box and up the sides and along inside corner regions representing areas such as the transition from the side wall to the wheel wells of the bed and other inside corner areas where there are abrupt changes in the contour of the box. It became apparent that another approach would have to be taken to control the lay-up of the fibers and it would have to be one that would work effectively in the making of a product of complex three dimensional shape such as that of a pick-up bed at production rates.

Approaches taken outside the field of directed fiber structural preforms to control the distribution of fibers across a foraminous screen include the use of baffles to regulate the flow of air across select portions of the screen. U.S. Pat. No. 3,962,753 discloses a system for making continuous glass fiber mats in which a foraminous conveyor screen is moved through a chamber containing fluidized fibers. In one embodiment, the bottom of the screen is supported by a fixed apertured plate and a second slidable apertured plate is supported against the bottom surface of the fixed apertured plate to partially or completely block all or some of the openings of the fixed plate so as to vary the vacuum draw through the screen and hence the lay-up of fibers. Such a baffling arrangement, however, requires multiple apertured plates and is limited in its application to planar screen surfaces or simple contours to accommodate a sliding plate.

U.S. Pat. No. 5,004,579 discloses another baffling system for controlling the draw of air through a foraminous screen in the manufacture of a multi-material fibrous article in which a plurality of screen cavities are arranged along an indexable drum communicating with a fiber delivery system. The space below the screens is open and partitioned to define a central vacuum chamber in a surrounding annular vacuum chamber communicating, respectively, with the central and edge regions of the screen. The chambers operate to control the flow of air through the screen for the express purpose of building a non-uniform accumulation of fibers on the screen and completely filling the volume of the recess.

Thus, it would be desirable to provide a directed fiber forming process and apparatus for making a complex three dimensional shaped structural fibrous preform having controls to regulate the lay-up of fibers on the preform screen, particularly at inside corner depressed regions of the screen, and other regions susceptible to overly excessive build-up when conventional directed fiber preforming processes and equipment are used.

SUMMARY OF THE INVENTION AND ADVANTAGES

A method of forming a fibrous structural preform of complex three-dimensional shape is provided for use in the manufacture of fiber reinforced molded plastic articles. The method includes preparing a foraminous screen having an outer male surface of complex three-dimensional shape corresponding to a surface of the preform, an inner female surface defining a cavity of the screen, and at least one depressed region susceptible to excessive build-up of fibers in the formation of the preform. A baffle having a size and shape complimenting that of the depressed region is supported within the cavity of the screen for movement between a blocked position in which the baffle is extended into nested blocking engagement with the depressed region, and an unblocked position in which the baffle is retracted from the screen in spaced relation to the depressed region. In a controlled fiber lay-up sequence, a vacuum is drawn through the screen while a flow of chopped fibers are directed toward the screen and are deposited and retained on the screen by the draw of the vacuum to develop a build-up of such fibers. During a predetermined period of the sequence, the baffle is extended into blocking engagement with the depressed region to block the vacuum draw therethrough and prevent the fibers from being deposited and building up across the depressed region. During the remaining period of the sequence, the baffle is retracted to the unblocked position to permit the deposition and build-up of fibers across the depressed region. The positioning of the baffle is controlled during the fiber lay-up sequence in order to develop a generally uniform thickness mat of such fibers across the surface of the screen. A curable binder is supplied to the fibers either during or following the application of the fibers against the screen and the binder is cured to set the mat of fibers in place on the screen.

The apparatus and method of this invention solves the problem of directed fiber forming three-dimensional structural preforms of complex shape, such as that which would be used in the manufacture of a SRIM utility box for a pick-up truck, having one or more depressed regions that are susceptible to excessive build-up of fibers. The baffling arrangement enables the draw of the vacuum through the depressed region to be controlled during fiber lay-up in order to develop the desired build-up of fibers in the depressed regions for a period of the sequence and then block the vacuum draw during the remaining period of the sequence to allow the surrounding region to develop a build-up of fibers corresponding generally to that of the depressed region. In this way, the SRIM product incorporating the structural preform will have a desired uniform strength and durability. This is particularly important, for example, in pick-up bed applications since the floor and sides of the bed are subject to heavy loads, frequent impact, and changes in temperature. The preform must provide the strength needed to withstand such conditions but yet not be overly strong so as to render the bed inflexible and brittle and hence subject to damage during use. The baffling fiber control approach of the present invention is particularly helpful in controlling the build-up of fibers across the convoluted strengthening rib regions of the floor and side walls of the bed which are prone to excessive build-up of fibers if not controlled.

THE DRAWINGS

These and other features and advantages of the present invention will be more fully understood and appreciated by those skilled in the art when considered in connection with the following detailed description and accompanying drawings, wherein:

FIG. 1 illustrates a SRIM bed of a pick-up truck made with a preform prepared according to the invention shown in association with side body panels and the tailgate that make up the utility box assembly of the truck;

FIG. 2 is a schematic view of a preform apparatus in accordance with the present invention;

DETAILED DESCRIPTION

A structural reaction injection molded (SRIM) bed of a pick-up truck is designated generally at 10 in FIG. 1 and embodies a structural fibrous preform as part of its composite structure prepared in accordance with the present invention. The bed 10 forms the interior structural shell of the overall pick-up bed box 12 and is shown in FIG. 1 in association with other components of the box 12, including exterior side panels 14 and tailgate 16 which may be prepared, according to conventional practice, from metal stampings.

Figure 3:
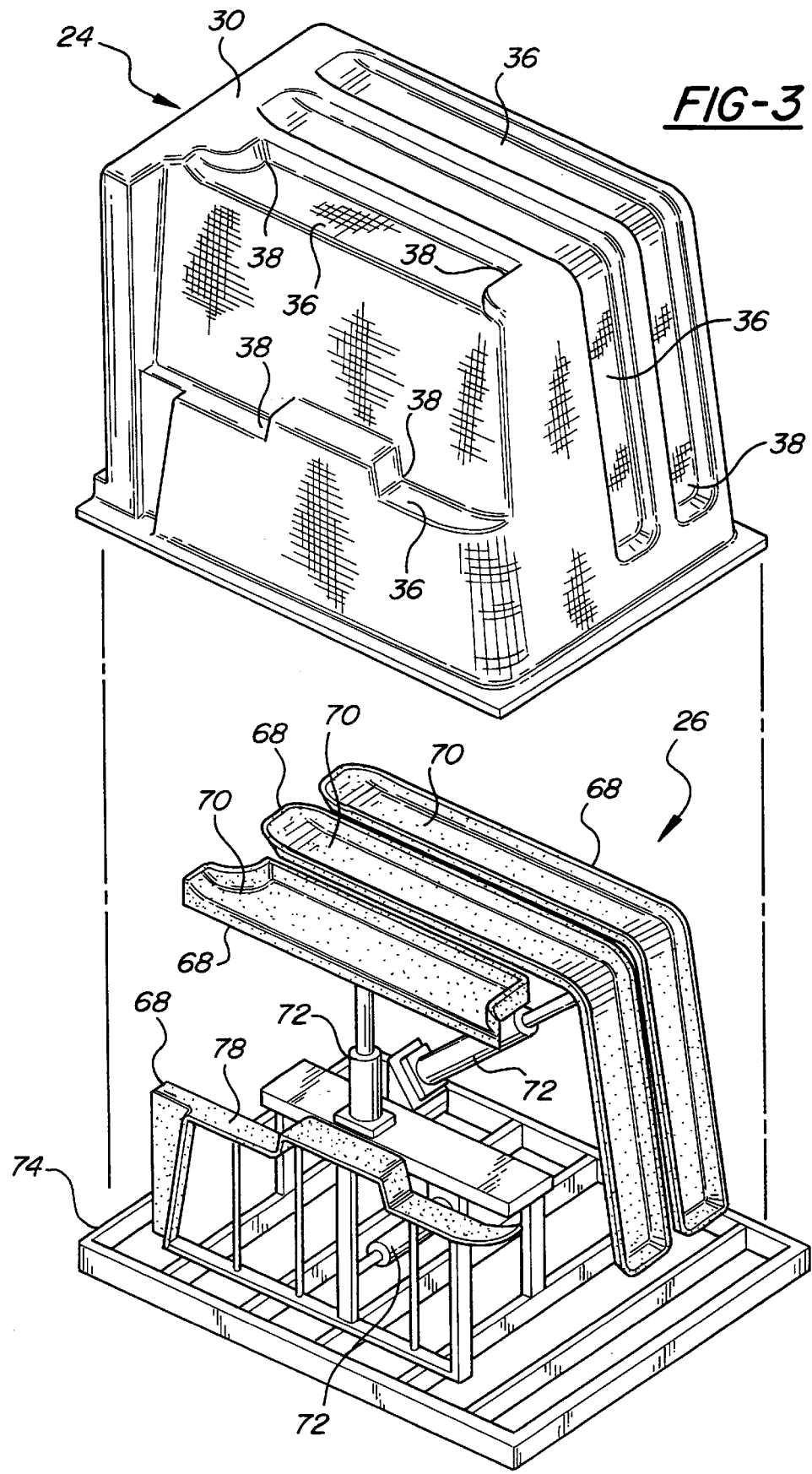
FIG. 3 is a schematic exploded perspective view of the preform screen and baffling system of the invention.

An apparatus for forming a fibrous structural preform of complex three-dimensional shape according to a presently preferred embodiment of the invention 18 is indicated generally by the reference numeral 20 in FIG. 2. The apparatus 20 includes a mounting table 22, a foraminous preform screen 24, a baffling system 26 beneath the screen 24 and a suction fan 28. The screen 24 (FIG. 3) is a rigid porous metal structural having an outer male surface 30 protruding outwardly from the table 22 and an inner female surface 32 defining an open space or cavity 34 on the backside of the screen 24 within which the baffling system 26 is supported. The screen 24 is contoured to conform with the shape of the preform and in the present case includes a number of recessed regions 36 marking abrupt changes in the outer surface contour of the screen producing sharp inside corner areas at the bases of the recessed regions 36. In forming a preform 18 for a pick-up bed application, for example, this screen would include a plurality of elongate recessed channels extending along the top of the screen and wrapping around to one or more of the side walls of the screen separated from one another by intervening non-recessed regions to generate a corrugated profile of alternating ridges and grooves corresponding to the profile of the strengthening ribs extending along the floor and side walls of the bed 10.

The preform apparatus 20 includes a spray assembly 40 which may be any one of several types known to the art such as those disclosed in the commonly owned U.S. Pat. Nos. 5,147,653; 5,217,672; 5,328,494; and 5,413,750, the disclosures of which are incorporated herein by reference. The assembly 40 includes a chopped fiber delivery tube 42 communicating with a chopper 44 and blower 46 at one end thereof and terminating in a flexible tube section 48 fitted with a nozzle for directing a flow of chopped fibers 49 from the delivery tube toward the adjacent outer surface of the screen 24. The chopper 44 chops a supply of glass roving 50 which can be chopped to various lengths ranging from a fraction of an inch to several inches. The material for the chopped fibers may be of the type presently used in the making of fibrous preforms for bumpers and the like, such as the commercially available roving sold under the brand name PPG-5542 and may incorporate reclaimed SRIM material, as described in the commonly owned U.S. Pat. No. 5,336,455, incorporated herein by reference.

A pump or blower delivers flowable heat-curable binder 54 from a supply 56 through a binder delivery tube 58 fitted on its end with a nozzle for directing the binder toward the screen 24. The fiber and binder delivery tubes may be mounted on a common gantry 60 enabling controlled movement of the nozzles left, right, up, or down relative to the screen 24. A plurality of nozzles 62 may be arranged circumferentially about the fiber and binder delivery nozzles and operatively connected to a blower 64 and heater 66 to direct a heated flow of air against the screen for purposes of heating and curing the binder simultaneously with the deposition of the fibers according to the teachings of the aforementioned U.S. Pat. No. 5,217,672. Alternatively, heat lamps or other conventional heating methods may be used to heat and cure the binder 54.

Figure 4:
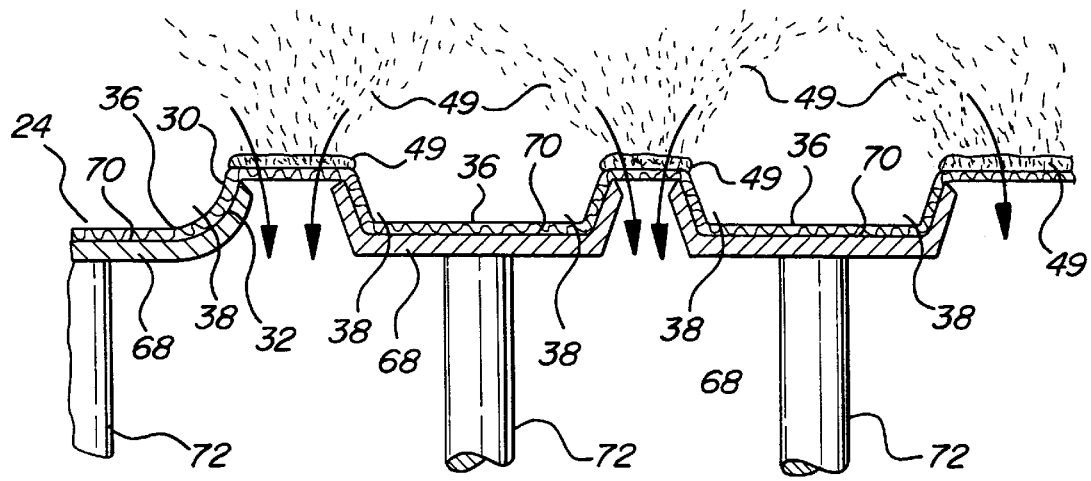
FIGS. 4 and 5 are enlarged fragmentary transverse, cross-sectional views across recessed regions of the screen during the fiber lay-up sequence showing the baffling system in the blocked and unblocked conditions, respectively, to control fiber build-up across the screen.
Figure 5:
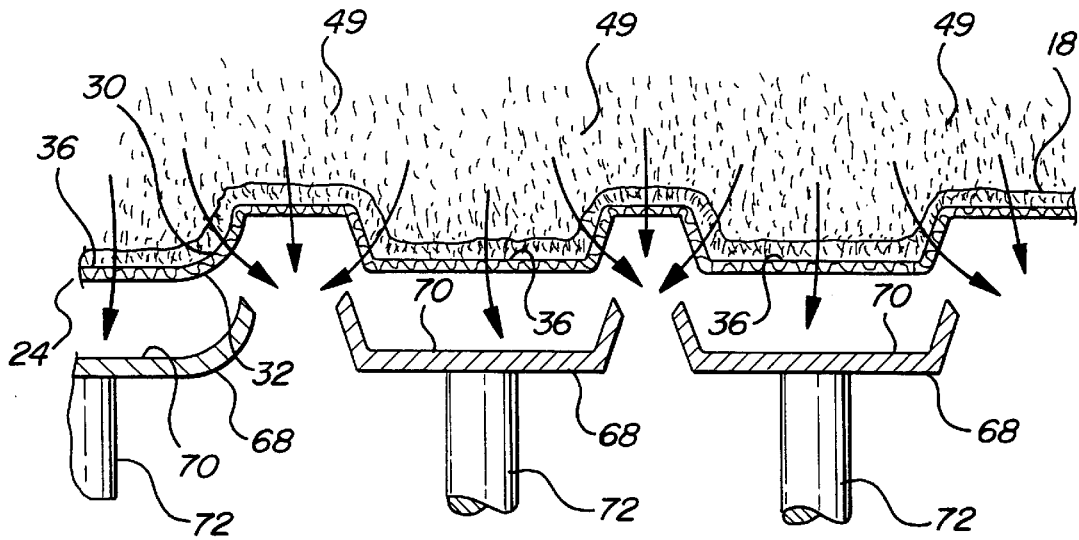

The baffling system 26 of the invention includes one or more baffle plates 68 of non-porous construction fabricated of metal plating or heat-resistent plastics material of a size and shape that conforms with the three-dimensional contours of the associated recessed regions 36 of the screen 24. In this way, the baffle plates 68 are able to nest in form-fitting engagement against the recessed regions 36, as to illustrate in FIG. 4, to render the recessed regions 36 impervious to the flow of air therethrough when the baffle plates are so positioned.

The baffle plates 68 are supported within the screen cavity 34 by movable supports, such as hydraulic actuating cylinders 72. An open frame structure 74 may extend across the intake opening 76 of the table 22 and provide a base for the actuators 72.

In a controlled fiber lay-up sequence the suction fan 28 is activated to draw a vacuum airflow through the screen 24. A flow of chopped fibers 49 is directed toward the screen 24 and is drawn and retained against the outer surface 30 of the screen by the vacuum. Because of the complex three-dimensional geometry of the screen involved at the present invention, portions of the screen, and particularly the recessed regions 36 are susceptible to accumulating a build-up of the fibers particularly along the inside corner areas 38 at a relatively greater rate than the remaining non-recessed regions of the screen. If left uncontrolled, the final preform would have much greater thickness across the recessed regions 36 as compared to the surrounding non-recessed regions of the screen.

The baffling system 26 is provided to counteract the imbalanced fiber accumulation. At some point during the fiber lay-up sequence, the baffle system 26 is activated to move the baffle plates 68 into blocked position against the recessed regions 36 for a period of time during which the vacuum draw through the recessed regions 36 is blocked causing the flow of fibers 49 to be drawn by the vacuum against the surrounding non-recessed regions of the screen. During the remaining period of the fiber lay-up sequence, the baffle plates 68 are retracted to their unblocked positions to reinstate the vacuum draw and hence permit the deposit and build-up of fibers across the recessed regions 36 of the screen 24. The period of times during which the baffle plates 68 are in the blocked and unblocked positions can be adjusted to control the relative build-up of fibers across the recessed and surrounding non-recessed regions of the screen. According to a preferred lay-up sequence of the invention, the baffles 68 are controlled is such manner to develop a generally uniform thickness mat of fibers across the screen 24.

The sequence of the positioning of the baffle plates 68 can also be controlled such that in one case they may start out in the unblocked position until a predetermined build-up of fibers has accumulated in the recessed regions 36 after which they are moved to the blocked positions to prevent further build-up of fibers across the recessed regions Alternatively, the baffle plates 68 may begin the lay-up sequence in the blocked position until the desired build-up is achieved across all but the recessed regions 36, after which the baffle plates 68 are retracted to the unblocked position to accumulate a desired build-up of the chopped fibers across the recessed regions 36 as well.

Figure 6:
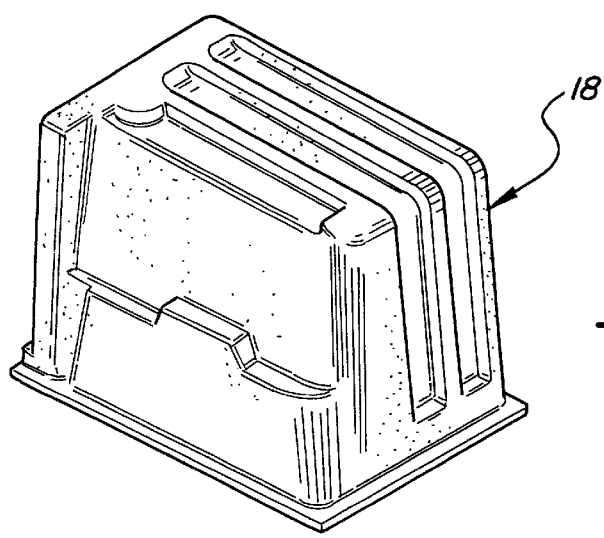
FIG. 6 is a schematic perspective view of a completed preform prepared in accordance with the invention.

The binder 54 may be supplied either simultaneously with the application of the fibers on the screen in accordance with the teachings of the aforementioned U.S. Pat. Nos. 5,217,672 and 5,336,455, as a coating on the fibers according to the teachings with the aforementioned U.S. Pat. No. 5,328,494, or after the fibers have been deposited on the screen 24. Heated air or radiant heat may be used to cure the binder 54 and set the mat of fibers in place on the screen 24 to generate the final preform structure 18 (FIG. 6).

The preform structure 18 is suitable for use in forming fiber reinforced plastic articles such as structural reaction molded (SRIM) articles formed by imprenating the preform with reactive polyurethane precursors including a polyol such as polyesters or polyethers and isocyanate material such as MDI or TDI, and suitable additives as are well known to those skilled in the art, or such plastic articles formed by injection of thermoset plastic materials such as epoxy, phenolics, polyesters, polyimides or thermosetting polyurethanes.

The disclosed embodiments are representative of presently preferred forms of the invention and are intended to be illustrative rather than definitive thereof. The invention is defined in the appended claims which contemplate various modifications within the spirit and scope of the invention.

We claim:

1. A method of forming a fibrous structural preform of complex three-dimensional shape for use in the manufacture of a fiber reinforced molded plastic article, said method comprising the steps of:

preparing a foraminous screen having an outer male surface of three-dimensional shape corresponding to a surface of the preform, an inner female surface defining a cavity of the screen, and at least one depressed region susceptible to excessive build-up of fibers in the formation of the preform;

preparing a baffle having a size and shape complementing that of the depressed region and supporting the baffle within the cavity of the screen for movement between a blocked position in which the baffle is extended into nested blocking engagement with the depressed region and an unblocked position in which the baffle is retracted away from the screen in spaced relation to the depressed region;

in a controlled fiber lay-up sequence, drawing a vacuum through the screen while directing a flow of chopped fibers toward the screen where the fibers are deposited and retained on the screen by the vacuum to develop a build-up of such fibers, and during a predetermined period of the sequence extending the baffle into blocking engagement with the depressed region to block the vacuum draw therethrough and prevent the fibers from being deposited and building up across the depressed region, and during a remaining period of the sequence retracting the baffle to the unblocked position spaced from the depressed region to permit the deposition and build-up of fibers across the depressed region, and controlling the positioning of the baffle during the sequence to develop a generally uniform thickness mat of such fibers across the surface of the screen; and supplying the fibers with a curable binder and curing the binder to set the mat of fibers in place on the screen.

2. The method of claim 1 wherein the depressed region is formed with a three-dimensional shape having side walls thereof projecting transversely into the cavity from the adjacent surrounding regions of the screen and wherein the baffle is formed with a complemental three-dimensional female blocking surface having transverse side walls that nests with the side walls of the depressed region when in the blocked position and are spaced from the side walls when in the unblocked position.

3. The method of claim 1 wherein the movement of the baffle between the blocked and unblocked positions is controlled by an actuating device having a movable arm portion coupled to said baffle.

4. The method of claim 1 wherein the baffle is moved initially to the blocked position at the commencement of the fiber lay-up sequence to deposit the fibers across all but the depressed region of the screen until a predetermined build-up of such fibers is attained, after which the baffle is retracted to the unblocked position to deposit fibers across at least the depressed region until a generally equal build-up of fibers is attained in the depressed region.

5. The method of claim 1 wherein the baffle is moved initially to the unblocked position at the commencement of the fiber lay-up sequence to deposit the fibers across the entire outer surface of the screen until a predetermined build-up of such fibers is attained in the depressed region, after which the baffle is extended to the blocked position to prevent further build-up of fibers in the depressed region while continuing to deposit fibers across the rest of the screen until a build-up is attained generally equal to that developed in the depressed region.

6. The method of claim 1 wherein said fiber reinforced plastic article is a structural reaction injection molded article.

7. The method of claim 1 wherein said fiber reinforced plastic article is a thermoset plastic article.

8. Apparatus for forming a fibrous structural preform of three-dimensional shape from chopped fibers and a curable binder for use in the manufacture of a fiber reinforced molded plastic article, said apparatus comprising:

- a foraminous screen having an outer male surface of three-dimensional shape corresponding to a surface of the preform to be made, an opposite female surface defining a cavity within the screen and communicating with a vacuum source for drawing a vacuum through the screen to deposit and retain chopped fibers against the outer surface of the screen, and including at least one depressed region susceptible to accumulating and excessive build-up of such fibers;
- a chopped fiber delivery system adjacent said screen for directing during a fiber lay-up sequence a flow of the fibers and binder toward the screen for deposition and retention thereon by the vacuum draw through the screen;
- a baffle device having a blocking plate portion supported within said cavity for movement during a predetermined period of said fiber lay-up sequence to a blocked position in which said blocking plate is extended into nested blocking engagement with said depressed region to block the vacuum draw through said depressed region while maintaining the vacuum draw through surrounding regions of the screen to prevent the deposit and build-up of fibers in across said depressed region during such period, and to an unblocked position during a remaining period of said fiber lay-up sequence in which said blocking plate retracted away from said screen in spaced relation to said depressed region to permit the deposit and build-up of fibers in said depressed region of the screen; and
- a binder delivery system for applying a heat-curable binder to the fibers and a heating device adjacent said screen for heating and curing the binder to set the fibers in p lace on said screen.

9. The apparatus of claim 8 wherein said depressed region of said screen has a multi-dimensional shape with side walls thereof extending transversely into said cavity from adjacent surrounding regions of said screen and wherein said blocking plate includes a correspondingly shaped blocking surface that nests with said side walls of said depressed region when in said blocked position.

10. The apparatus of claim 8 including an actuator device having a movable portion coupled to said blocking plate for selective movement of said plate between said blocked position and said unblocked position.

* * * * *